United States Patent
Hsin et al.

(10) Patent No.: US 9,563,956 B2
(45) Date of Patent: Feb. 7, 2017

(54) EFFICIENT FREE-SPACE FINGER RECOGNITION

(71) Applicant: Intel Corporation, Santa Clara, CA (US)

(72) Inventors: Chih-Fan Hsin, Portland, OR (US); Martin Pettersson, Knivsta (SE)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 14/225,941

(22) Filed: Mar. 26, 2014

(65) Prior Publication Data
US 2015/0279019 A1 Oct. 1, 2015

(51) Int. Cl.
| | | |
|---|---|---|
| G06T 7/00 | (2006.01) | |
| G06F 3/03 | (2006.01) | |
| G06K 9/00 | (2006.01) | |
| H04N 7/18 | (2006.01) | |
| G06F 3/01 | (2006.01) | |
| G06F 3/042 | (2006.01) | |
| G06K 9/44 | (2006.01) | |

(52) U.S. Cl.
CPC .............. *G06T 7/004* (2013.01); *G06F 3/017* (2013.01); *G06F 3/0304* (2013.01); *G06F 3/0308* (2013.01); *G06F 3/0425* (2013.01); *G06K 9/00375* (2013.01); *G06K 9/00382* (2013.01); *G06K 9/44* (2013.01); *G06T 7/0042* (2013.01); *G06T 7/0057* (2013.01); *H04N 7/183* (2013.01); *G06T 2207/10028* (2013.01); *G06T 2207/10048* (2013.01); *G06T 2207/20144* (2013.01); *G06T 2207/30196* (2013.01)

(58) Field of Classification Search
CPC ...... G06T 7/004; G06T 7/0042; G06T 7/0057; G06T 2207/10028; G06T 2207/10048; G06T 2207/20144; G06T 2207/30196; G06F 3/017; G06F 3/0304; G06F 3/0308; G06F 3/0435; G06K 9/00382; H04N 7/183
USPC ........................................................ 348/77
See application file for complete search history.

(56) References Cited

U.S. PATENT DOCUMENTS

| | | | | |
|---|---|---|---|---|
| 2011/0205186 | A1* | 8/2011 | Newton | G06F 3/011 345/175 |
| 2013/0257748 | A1* | 10/2013 | Ambrus | G02B 27/0093 345/173 |
| 2013/0343601 | A1* | 12/2013 | Jia | G06K 9/00355 382/103 |
| 2014/0300870 | A1* | 10/2014 | Nishioka | G06F 3/0423 353/31 |
| 2015/0054735 | A1* | 2/2015 | Nakama | G06F 3/0325 345/156 |

\* cited by examiner

*Primary Examiner* — William C Vaughn, Jr.
*Assistant Examiner* — Jae N Noh
(74) *Attorney, Agent, or Firm* — Schwegman Lundberg & Woessner, P.A.

(57) ABSTRACT

Systems and techniques for efficient free-space finger recognition are herein described. A surface in a depth image may be identified. One or more blobs in the depth image may be identified. The identified blobs may be analyzed to determine if a blob intersects with an edge of the depth image and classified as a potential hand if the blob does intersect with the edge or classified as an object otherwise.

22 Claims, 5 Drawing Sheets

EFFICIENT FREE-SPACE FINGER RECOGNITION

TECHNICAL FIELD

Embodiments described herein generally relate to perceptive computing and more specifically to efficient free-space finger recognition.

BACKGROUND

Perceptual computing (e.g., future computing) may include Projected Touch Surface (PTS) interfaces. PTS may use a projector to project user interface elements on a surface, such as a desk or a table. Because the surface itself may not be able to accept input, the PTS may use other sensors to observe interactive behaviors and use these as inputs. For example, the PTS may include a depth sensor to identify fingers (e.g., finger tips) moving (or being positioned) on or around the projected user interface to determine interactions with the interface.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

At present, a common way for PTS systems to detect a fingertip touching a projected user interface element is to use a depth image from the depth sensor. Next, a hand blob may be found from the depth image. As used herein, a blob is a region (e.g., collection of pixels, sub-pixels, voxels, etc.) of a digital image in which some properties (e.g., distance from a point, connectivity, color, luminance, etc.) are constant or vary within a prescribed range of values. After a hand blob is found, a finger skeleton may be found (e.g., modeled) from the hand blob. Finally, a three dimensional (3D) position for one or more fingertips may be located from the hand skeleton to determine interaction with the projected user interface. In an example, the hand skeleton may be used to determine gestures input from the user on or above the projected surface.

At least two problems arise from current implementations of PTS systems. First, calculating a hand skeleton from blobs in a depth image is a computationally intensive process that may be wasted on non-hand blobs, such as objects not used for input. An example of such an object may include a cup placed on a desk that happens to be within the field of view of the depth sensor. This problem is compounded as depth sensor resolutions increase.

Second, current depth sensor performance may not be able to mimic a close-to-touch-screen user experience because of, for example, an inability to keep up with the user, lack of depth resolution, noisy depth images, etc. In some examples, a line emitter may be used to project a plane of light parallel and close to the touch surface. Thus, a finger touching the surface will break the plane and reflect light to, for example, a camera of the PTS system and indicate a touch occurred. However, in examples where the depth sensor uses a camera sensitive to the line emitter wavelength, the camera may not be able to tell the difference between a touch and an object placed close to the camera.

The first problem may be solved by classifying blobs as a potential hand or as an object based on whether the blob encounters an edge of the depth image. Classifying blobs in such a way is based on the observation that hands are likely connected to arms and thus bodies that are typically outside of the viewing frustum of the depth sensor. In contrast, objects, such as cups, phones, pens, etc. may be wholly within the viewing frustum. Blobs classified as objects may avoid being subjected to hand skeleton analysis and thus save expensive computational operations. Thus, saving these computational resources may increase the efficiency of the PTS system.

The second problem may be solved by combining depth data with bright spot identification cause by a finger interrupting the plane of light emitted by a line emitter. Here, bright spots may be recorded in an image prior to depth calculation. For example, if the depth sensor comprises an infrared (IR) emitter and an IR sensitive camera, and the line emitter emits IR light, an image captured by the depth sensor camera prior to depth analysis may be used to detect bright spots of IR light. As noted above, these bright spots may be caused by a finger interrupting the plane of IR light and reflecting a portion of it back to the camera. The bright spots may be identified and then classified based on the depth image such that bright spots close to the surface are classified as touches and bright spots away from the surface are non-touches. Further, bright spots may be eliminated as possible touches based on other factors. For example, if the bright spot is inconsistent with a model of, for example, a fingertip (e.g., in size, shape, etc.), the bright spot may be classified as no-touch. In an example, a hand skeleton may be determined from the depth image. If the bright spot does not correspond to a finger of the hand skeleton, it may also be classified as no-touch. By identifying potential touch bright spots, in air gestures above the touch surface may be used without invoking erroneous touches on the projected user interface. Thus, a combination of depth sensor and line emitter can increase the user experience by increasing input accuracy for the PTS system.

The solutions given above may be used separately or combined in a variety of ways. For example, efficiently determining hand skeletons by avoiding processing on object blobs may allow for efficient bright spot analysis by eliminating bright spots that do not correspond to a potential hand blob. In all cases, however, one or all of computational efficiency and accuracy are increased, leading to a more efficient recognition of fingers in free space (e.g., not actually interacting with a touch sensitive surface) for PTS systems.

Figure 1:
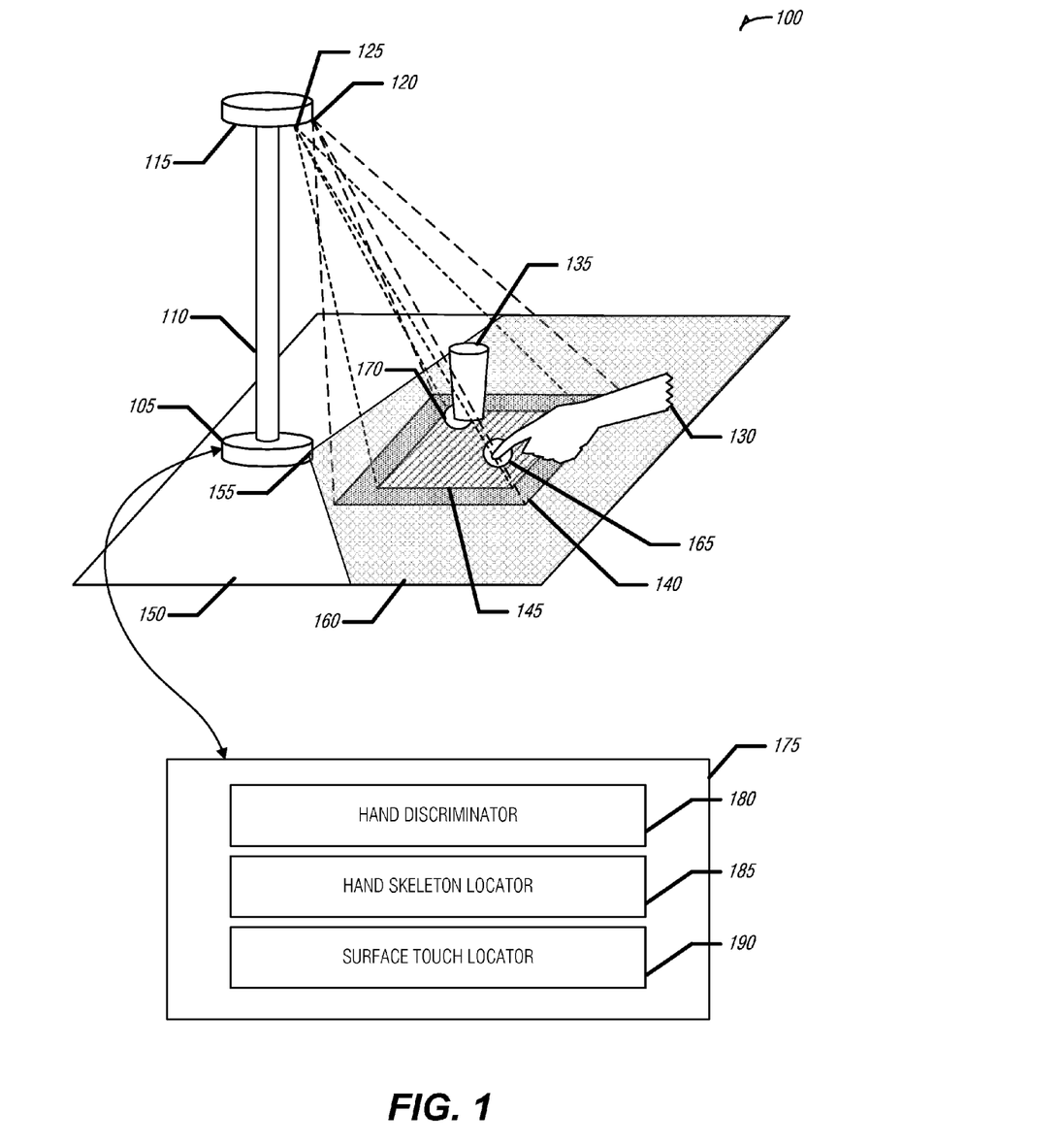
FIG. 1 illustrates an example PTS system including a block diagram of a circuit implemented device for efficient free-space finger recognition, according to an embodiment.

FIG. 1 illustrates an example PTS system 100 including a block diagram of a circuit implemented device 175 for efficient free-space finger recognition. The PTS system 100 may include a base 105, a vertical member 110 (the lower portion of which may be affixed to the base 105), and a head 115 (which may be affixed to an upper portion of the vertical member 110. The PTS system 100 may also include a circuit implemented device 175 capable of being communicatively coupled to (e.g., wired, wirelessly, placed within) one or more of the base 105, vertical member 110, or the head 115.

The head 115 may include a depth sensor 120 arranged to have a downward field of view. As illustrated, the thick dashed lines indicate the field of view of the depth sensor 120. The shaded region 140 indicates the base plane 140 in the viewing frustum of the depth sensor. The base plane 140 coincides with the surface 150. In an example, the head 115 may also include a projector 125 to implement the projected user interface 145 (illustrated by the lined region 145). In an example, the projector 125 may be placed elsewhere, such as in a ceiling, another device, etc. In an example, the depth sensor 120 includes a camera and light emitter. Depth images may be created by timing the round trip of emissions from the light emitter reflecting off of objects in the viewing frustum and being captured by the camera. In an example, the camera is sensitive to IR light and the light emitter emits in the IR spectrum.

In an example, the base 105 may include a line emitter 155. The line emitter 155 may emit a plane of light 160 (indicated by the cross-hatched region 160) parallel to the surface 150. As discussed above, such an emission may cause bright spots when intersected, such as object bright spot 170 and touch bright spot 165.

As illustrated in FIG. 1, the cup 135 represents both the actual object of a cup and a blob in a depth image. Similarly, the hand and wrist (referred hereinafter as the hand) 130 also represent both an actual hand and a blob in a depth image.

The circuit implemented device 175 is one or more machines capable of being communicatively coupled to any or all of the base 105, the vertical member 110, or the head 115 to receive the depth sensor or bright spot data. In an example, one or all of the components of the circuit implemented device 175 are housed within one or more of the base 105, the vertical member 110, or the head 115. The circuit implemented device 175 may include any or all of a hand discriminator 180, a hand skeleton locator 185, or a surface touch locator 190.

The hand discriminator 180 may be arranged to identify the surface 150 in a depth image captured by the depth sensor 120. Surface identification allows pixels in the depth image (e.g., voxels) to be classified as outlying pixels (e.g., pixels between the surface 150 and the depth sensor 120 or pixels not on the surface 150). It is from outlying pixels that blobs (e.g., hand 130 and cup 135) are identified. In an example, the hand discriminator 180 is arranged to identify one or more blobs (e.g., the hand 130 or the cup 135) from the depth image. In an example, blobs may be identified without first identifying the surface 150. In an example, a blob comprises a plurality of contiguous pixels (e.g., outlying pixels) in the depth image. Because depth images may be noisy, whether or not pixels are contiguous may be determined by calculating a distance between two pixels and comparing the distance to a threshold. Thus, if the pixel distance is under the threshold, the two pixels are considered contiguous. It is noted, however, that any of a variety of known methods may be used to determine what pixels constitute a blob. In an example, an external contour (e.g., outline) of outlying pixels may be calculated. Pixels within the external contour are part of (e.g., make-up) the blob.

The hand discriminator 180 may also be arranged to classify identified blobs. For example, for each identified blob, the hand discriminator 180 may determine if the blob intersects an edge of the depth image. If the blob does intersect the edge, the blob may be classified as a potential hand. If the blob does not intersect the edge, it may be classified as an object. In an example, a blob placed closely (e.g., within a pre-identified tolerance or distance based on the environment) may be classified as a potential hand. In this example, closeness is determined based on one or more operational parameters of the PTS system, such as depth image noise, positioning of the depth sensor 120, the depth sensor field of view, etc. In an example, closeness is within a predetermined number of pixels from the depth image edge.

In an example, to determine if a blob intersects an edge of the depth image, the hand discriminator 180 may be arranged to create a mask of the depth image. Blobs within the mask may be classified as intersecting the edge, or simply as potential hands. Blobs outside of the mask may be classified as not intersecting the edge, as objects, or simply ignored. In an example, ignoring a blob is equivalent to classifying the blob as an object. To create the mask, the hand discriminator may begin with a blank mask, such as a grid corresponding to pixels in the depth image wherein elements of the grid have a blank value. The hand discriminator may add to the blank mask a number of pixels from each edge of the depth image to the mask, thus creating a border. In an example, an edge of the border may include a different depth of pixels than other edges of the border. In an example, a border edge may not be linear.

Figure 2A:
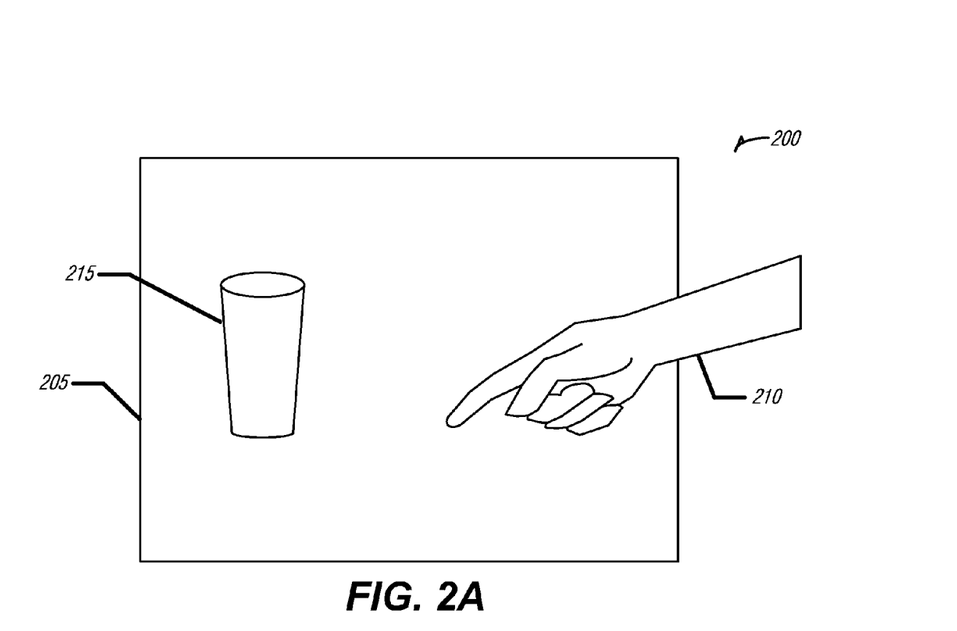
FIGS. 2A-2B illustrate an example of a depth image and a mask for efficient free-space finger recognition, according to an embodiment.
Figure 2B:
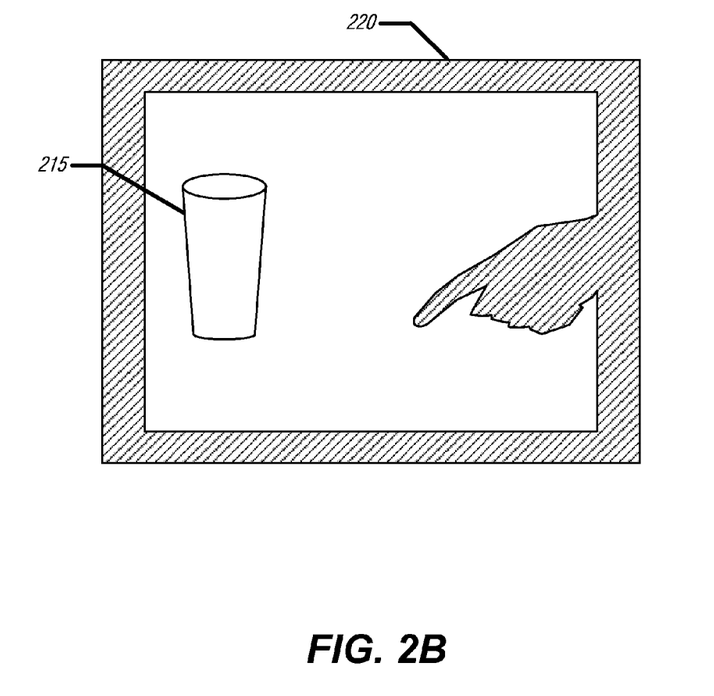

After the border pixels are added to the mask, the hand discriminator may determine whether a blob pixel, or contour corresponding to a blob, of the depth image corresponds to the mask (e.g., the current mask includes a pixels that overlaps with the contour or blob pixel). In this case, the pixels of the blob (e.g., those within the contour on the contour itself) are added to the mask. An example of this is illustrated in FIGS. 2A and 2B and discussed below.

The hand skeleton locator 185 may be arranged to determine whether a hand skeleton model can be found for a blob. The hand skeleton locator 185 may employ any number of known techniques to a blob to compute, find, match, etc. a hand skeleton to the blob. In an example, the activities of the hand skeleton locator 185 are restricted to blobs that are potential hands. Thus, the hand skeleton locator 185 may only be applied to blobs classified as a potential hand. In an example, the hand skeleton locator 185 receives the blobs and the classifications determined by the hand discriminator 180 and determines which blobs to process. In an example, the hand skeleton locator 185 receives only blobs classified as a potential hand.

The surface touch locator 190 may be arranged to identify one or more bright spots (e.g., bright spots 165 and 170) in an infrared image captured by the infrared camera. In an example, the bright spots may include a plurality of pixels above a threshold delineating light from dark. In an example, the threshold has two components, a high value and a low value. Thus, pixels above the high value may be considered bright, pixels below the low value may be considered dim, and other pixels may be of indeterminate luminance. In an example, indeterminate pixels may be further processed to determine whether they are bright or not. In an example, the further processing may be selectively applied based on available computational resources of the PTS system 100.

The surface touch locator 190 may also be arranged to process the identified bright spots to classify them as either a touch or a no-touch. In an example, the classification is based on a captured depth image. In an example, the classification may be limited to the size, shape, or other characteristics of the bright spot and not involve the depth image. For example, the surface touch locator 190 may have a model of a finger (or fingertip), or a size or shape parameter of a finger. This model may be compared to a bright spot. If the bright spot does not conform to the model parameters, it may be classified as a no-touch. For example, bright spot 170 for the cup 135 may be significantly wider than expected for a fingertip. In an example, such bright spots may be omitted from further processing.

In an example, to classify the bright spot as either a touch or a no-touch, the surface touch locator 190 may determine whether the bright spot is within a predetermined distance from the surface 150 using the depth image. If the bright spot is further away from the surface 150 than the predetermined distance, the bright spot may be classified as no-touch. Thus, simply observing that the bright spot is not near the surface may permit its classification as no touch and avoid further processing.

In an example, to classify the bright spot as either a touch or a no-touch, the surface touch locator 190 may determine whether the bright spot is connected to a hand blob identified from the depth image and classify the bright spot as no-touch if the bright spot is not connected to the hand blob. For example, bright spot 170 may be classified as no touch because it is not connected to hand blob 130.

As discussed above, the surface touch locator 190 may employ a number of mechanisms to classify a bright spot as no-touch. These mechanisms may be applied serially to avoid, for example, hand blob identification if the bright spot does not conform to a finger model. In an example, any bright spot that is not classified as no-touch at the end of a processing chain, such as those described above, is classified as a touch.

As described above, the efficiencies of the hand discriminator 180 and the surface touch locator 190 may be used separately or combined. For example, the hand discriminator 130 may provide efficient hand blob 130 identification for the surface touch locator 190 to use. Conversely, the surface touch locator 190 may identify bright spots as a touch (e.g., bright spot 165) based on a finger model analysis and add the pixels of the bright spot to the mask to facilitate hand blob 130 detection. In any of these scenarios, the computational efficiency or the accuracy of the PTS system 100 may be increased, leading to a better user experience.

FIGS. 2A-2B illustrate an example 200 of a depth image 205 and a mask 220 for efficient free-space finger recognition. In FIG. 2A, the depth image 205 includes an object blob 215 and potential hand blob 210. The potential hand blob 210 is illustrated extending beyond the depth image's edge to demonstrate that the blob 210 intersects an edge of the depth image. The outlines of both blobs 210 and 215 may be considered the contours described above. FIG. 2B illustrates the mask 220 applied to the depth image 205. As illustrated, the mask 220 includes a border. The portion of the potential hand blob 210 is also included in the mask 220 because the border covers a portion of the potential hand blob 210 as described above. The object blob 215 may not be processed further (e.g., no hand skeleton will be attempted for it) because it is not covered by the mask 220.

Figure 3:
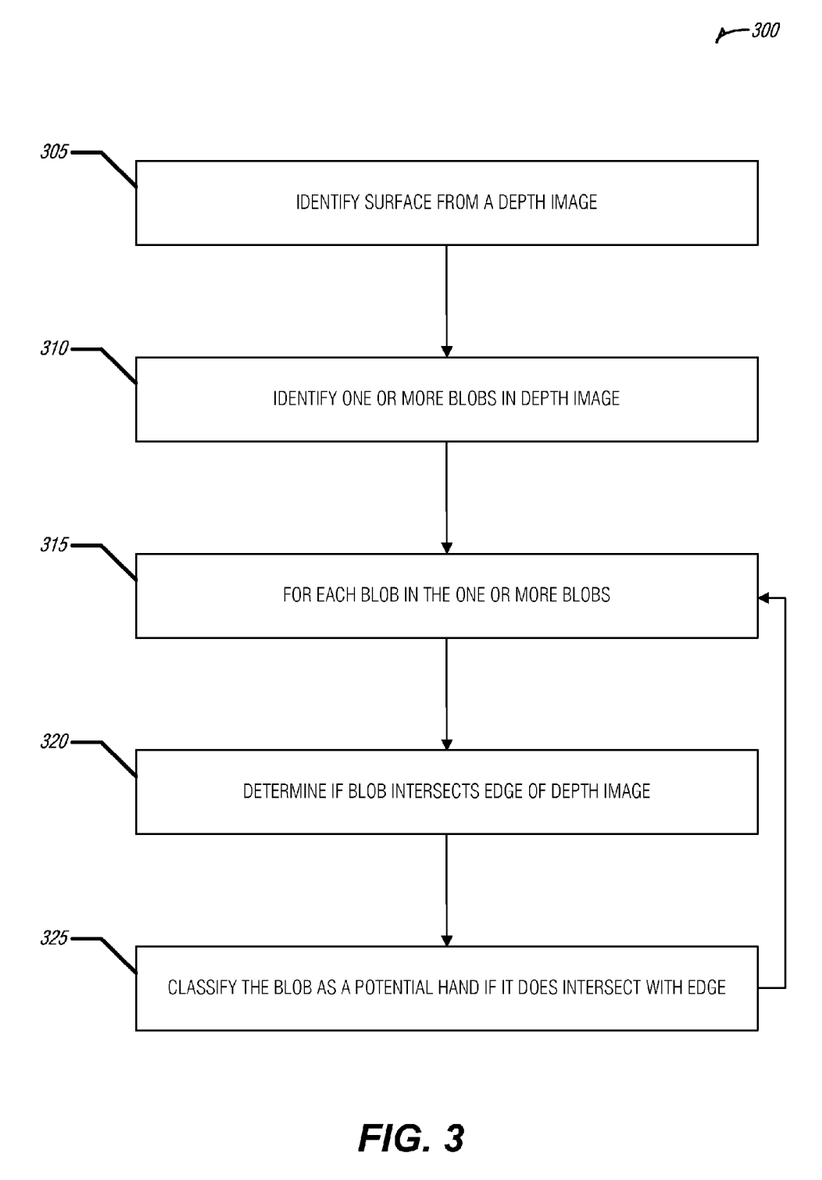
FIG. 3 illustrates an example of a method for efficient free-space finger recognition, according to an embodiment.

FIG. 3 illustrates an example of a method 300 for efficient free-space finger recognition, according to an embodiment.

At operation 305, a surface in a depth image captured by the depth sensor may be identified. The surface may be a base plane in a viewing frustum derived from the depth image.

At operation 310, one or more blobs in the depth image may be identified. As described above, a blob in the one or more blobs may include a plurality of contiguous pixels in the depth image that are closer to the depth sensor than the surface. In an example, to identify the blobs may include identifying outlying pixels. As described above, outlying pixels may be pixels in the depth image between the surface and the depth sensor. In an example, external contours of the outlying pixels may be determined. In an example, a closed contour may correspond to a blob. Accordingly, the pixels enclosed by the closed contour, and in an example, the contour itself, constitute a blob. In an example, an edge of the depth image may be part of a contour. Thus, a blob intersecting the edge is closed by its contour and the edge.

At operation 315, for each blob in the one or more blobs identified from operation 310, operations 320 and 325 may be applied. When there are no more identified blobs, the method 300 may terminate or move on to other processing (e.g., identifying hand skeletons in potential hand blobs).

At operation 320, for a given blob, it may be determined whether the blob intersects an edge of the depth image. In an example, determining whether a blob intersects an edge includes creating a mask corresponding to the depth image. A blob covered by the mask is considered to intersect the edge. In an example, to create the mask, a predetermined number of pixels from each edge of the depth image may be added to the mask. Then, pixels of a blob may be added to the mask when a pixel of the blob, or its contour, correspond to an existing pixel of the mask.

At operation 325, a blob that does intersect the edge of the depth image may be classified as a potential hand blob. If the blob does not intersect the edge, it may be classified as an object blob.

In an example, an attempt to find a hand skeleton may be made for a blob. In an example, such an attempt is not made if the blob is classified as an object. Thus, expensive hand skeleton computations may be avoided via the method 300.

Figure 4:
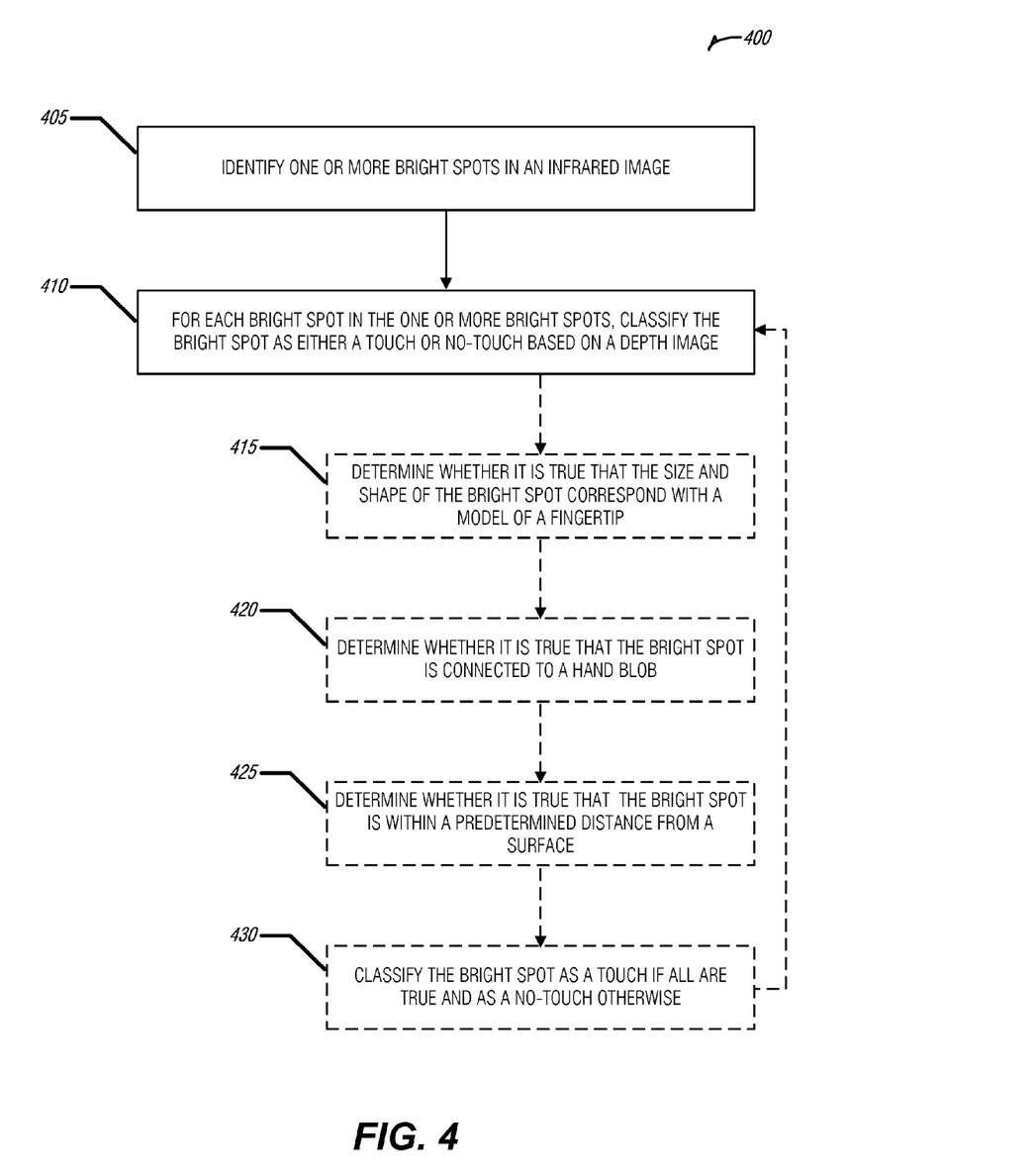
FIG. 4 illustrates an example of a method for efficient free-space finger recognition, according to an embodiment.

FIG. 4 illustrates an example of a method 400 for efficient free-space finger recognition, according to an embodiment.

At operation 405, one or more bright spots in an image captured by a camera may be identified. The bright spots comprising a plurality of pixels above a luminance threshold, such as that described above with respect to FIG. 1. In an example, the image is an IR image and the camera is sensitive to IR light (e.g., an IR camera).

At operation 410, bright spots may be classified as either touch or no touch. In an example, such classification is based on a depth image. In an example, such classification may include determining whether the bright spot is connected to a hand blob identified from the depth image and classifying the bright spot as no-touch if the bright spot is not connected to the hand blob. In an example, such classification may include determining whether the bright spot is within a predetermined distance from the surface using the depth image and classifying the bright spot as no-touch if the bright spot is not within the predetermined distance. In an example, for each bright spot identified at operation 405, operations 415, 420, 425, and 430 may be performed.

At operation 415, it may be determined whether the size and shape of the bright spot correspond with a model for a fingertip.

At operation 420, it may be determined whether the bright spot is connected to a hand blob.

At operation 425, it may be determined whether the bright sport is within a predetermined distance from the surface.

At operation 430, if each of the results of operations 415, 420, and 425 are true, the bright spot may be classified as a touch. Otherwise (e.g., if any of operations 415, 420, and 425 are false), the bright spot may be classified as a no-touch. In an example, operations 415, 420, and 425 may be implemented in any order. In an example, operations 415, 420, and 425 may be performed serially such that a false determination at an earlier operation results in a no-touch classification and precludes further operations.

By using the method 400, touch accuracy for PTS systems may be increased resulting in a better user experience. Further, the flexible nature of the method 400 may also result in computational efficiency without reducing accuracy by identifying no-touch bright spots early and precluding additional processing.

Figure 5:
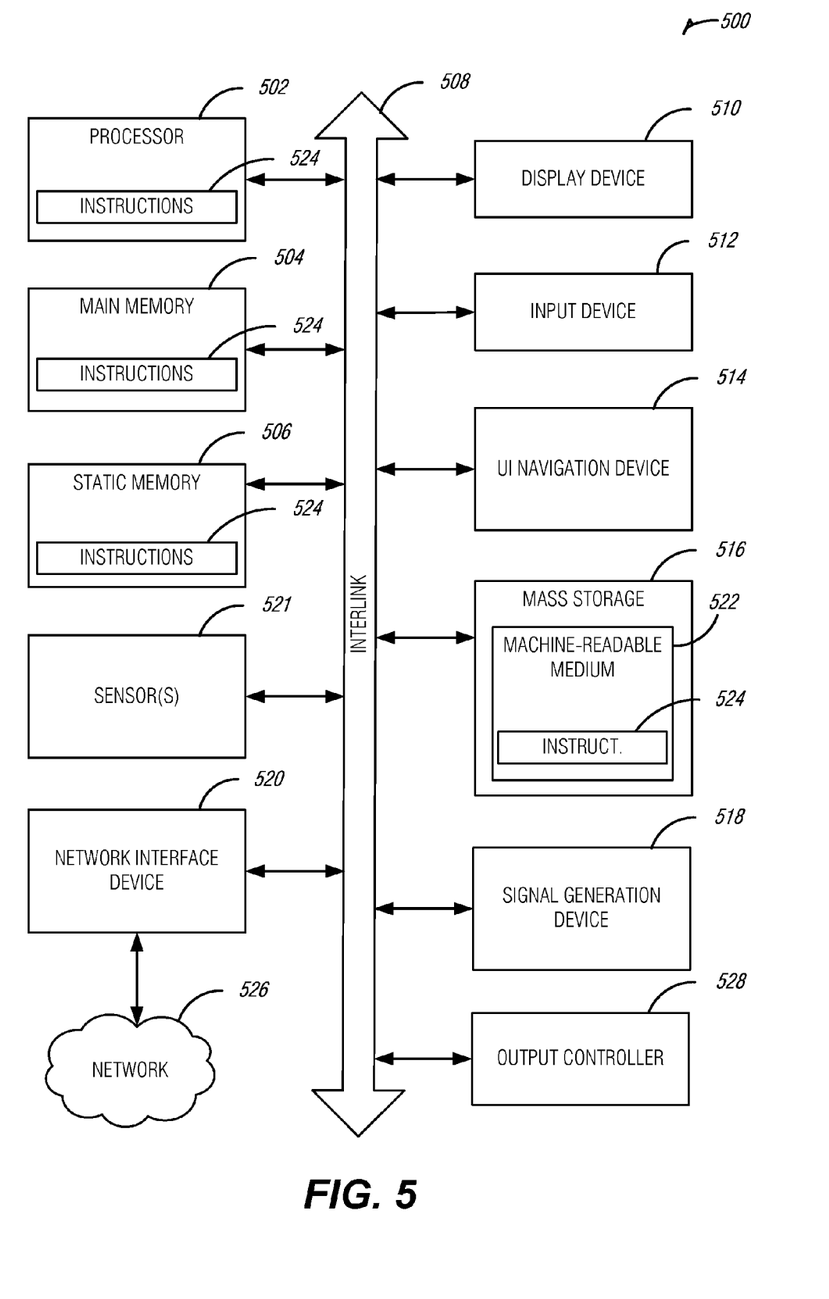
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1

A device for efficient free-space finger recognition, the device comprising: a base; a vertical member, a lower portion of the vertical member affixed to the base; a head affixed to an upper portion of the vertical member, the head comprising a depth sensor arranged to have a downward field of view; and a hardware circuit implemented hand discriminator to: identify a surface in a depth image captured by the depth sensor, the surface being a base plane in a viewing frustum derived from the depth image; identify one or more blobs in the depth image, a blob in the one or more blobs comprising a plurality of contiguous pixels in the depth image that are closer to the depth sensor than the surface; and for each blob in the one or more blobs: determine if the blob intersects an edge of the depth image; and classify the blob as a potential hand if it does intersect with the edge and classify the blob as an object otherwise.

In Example 2, the subject matter of Example 1 may optional include, wherein to identify the one or more blobs, the hand discriminator is to: identify outlying pixels, outlying pixels being pixels in the depth image between the surface and the depth sensor; and determine external contours of the outlying pixels, each contour that is closed corresponding to a blob in the one or more blobs.

In Example 3, the subject matter of Example 2 may optionally include, wherein to determine if the blob intersects the edge includes the hand discriminator to create a mask corresponding to the depth image by: adding a predetermined number of pixels from each edge of the depth image to the mask; and adding the pixels of a blob to the mask when a pixel of the contour corresponds to an existing pixel of the mask.

In Example 4, the subject matter of any of Examples 1-3 may optionally include a hand skeleton locator to determine whether a hand skeleton model can be found for a blob.

In Example 5, the subject matter of Example 4 may optionally include, wherein the hand skeleton locator is only applied to blobs classified as a potential hand.

In Example 6, the subject matter of any of Examples 1-5 may optionally include, wherein the depth sensor includes an infrared emitter and an infrared camera, and wherein the base includes an infrared line emitter to emit a plane of infrared light parallel to the surface within the field of view.

In Example 7, the subject matter of Example 6 may optionally include a surface touch locator to: identify one or more bright spots in an infrared image captured by the infrared camera, the bright spots comprising a plurality of pixels above a threshold; and for each bright spot in the one or more bright spots, classify the bright spot as either a touch or a no-touch based on the depth image.

In Example 8, the subject matter of any of Examples 6-7 may optionally include, wherein to classify the bright spot as either a touch or a no-touch includes the surface touch locator to determine whether the bright spot is connected to a hand blob identified from the depth image and classify the bright spot as no-touch if the bright spot is not connected to the hand blob.

In Example 9, the subject matter of any of Examples 6-8 may optionally include, wherein to classify the bright spot as either a touch or a no-touch includes the surface touch locator to determine whether the bright spot is within a predetermined distance from the surface using the depth image and classify the bright spot as no-touch if the bright spot is not within the predetermined distance.

In Example 10, the subject matter of any of Examples 6-9 may optionally include, wherein to classify the bright spot as either a touch or a no-touch includes the surface touch locator to: determine whether the size and shape of the bright spot correspond with a model for a fingertip; determine whether the bright spot is connected to a hand blob; determine whether the bright sport is within a predetermined distance from the surface; and if each of the size and shape of the bright spot correspond with a model for the fingertip, the bright spot is connected to the hand blob, and the bright spot is within a predetermined distance from the surface are true, classify the bright spot as a touch and classify the bright spot as no-touch otherwise.

Example 11, the subject matter of any of Examples 1-10 may include, or may optionally be combined with, subject matter including a method for efficient free-space finger recognition, the method performed by a circuit implemented device including a depth sensor arranged to have a downward field of view, the method comprising: identifying a surface in a depth image captured by the depth sensor, the surface being a base plane in a viewing frustum derived from the depth image; identifying one or more blobs in the depth image, a blob in the one or more blobs comprising a plurality of contiguous pixels in the depth image that are closer to the depth sensor than the surface; and for each blob in the one or more blobs: determining if the blob intersects an edge of the depth image; and classifying the blob as a potential hand if it does intersect with the edge and classify the blob as an object otherwise.

In Example 12, the subject matter of Example 11 may optionally include, wherein identifying the one or more blobs includes: identifying outlying pixels, outlying pixels being pixels in the depth image between the surface and the depth sensor; and determining external contours of the outlying pixels, each contour that is closed corresponding to a blob in the one or more blobs.

In Example 13, the subject matter of Example 12 may optionally include, wherein determining if the blob intersects the edge includes creating a mask corresponding to the depth image by: adding a predetermined number of pixels from each edge of the depth image to the mask; and adding the pixels of a blob to the mask when a pixel of the contour corresponds to an existing pixel of the mask.

In Example 14, the subject matter of any of Examples 11-13 may optionally include determining whether a hand skeleton model can be found for a blob.

In Example 15, the subject matter of Example 14 may optionally include, wherein determining whether a hand skeleton model can be found for the blob is limited to blobs classified as a potential hand.

In Example 16, the subject matter of any of Examples 11-15 may optionally include, wherein the depth sensor includes an infrared emitter and an infrared camera, and wherein a base for the device includes an infrared line emitter to emit a plane of infrared light parallel to the surface.

In Example 17, the subject matter of Example 16 may optionally include: identifying one or more bright spots in an infrared image captured by the infrared camera, the bright spots comprising a plurality of pixels above a threshold; and for each bright spot in the one or more bright spots, classifying the bright spot as either a touch or a no-touch based on the depth image.

In Example 18, the subject matter of any of Examples 16-17 may optionally include, wherein classifying the bright spot as either a touch or a no-touch includes determining whether the bright spot is connected to a hand blob identified from the depth image and classifying the bright spot as no-touch if the bright spot is not connected to the hand blob.

In Example 19, the subject matter of any of Examples 16-18 may optionally include, wherein classifying the bright spot as either a touch or a no-touch includes determining whether the bright spot is within a predetermined distance from the surface using the depth image and classifying the bright spot as no-touch if the bright spot is not within the predetermined distance.

In Example 20, the subject matter of any of Examples 16-19 may optionally include, wherein classifying the bright spot as either a touch or a no-touch includes: determining whether the size and shape of the bright spot correspond with a model for a fingertip; determining whether the bright spot is connected to a hand blob; determining whether the bright sport is within a predetermined distance from the surface; and if each of the size and shape of the bright spot correspond with a model for the fingertip, the bright spot is connected to the hand blob, and the bright spot is within a predetermined distance from the surface are true, classifying the bright spot as a touch and classify the bright spot as no-touch otherwise.

Example 21, the subject matter of Examples 11-20 may optionally include, a machine readable medium including instructions that, when executed by a machine, cause the machine to perform any one or more of the methods of Examples 11-20.

Example 22, the subject matter of any of Examples 11-20 may optionally include a system with means to perform any one or more of the methods of Examples 11-20.

Example 23, the subject matter of any of Examples 1-22 may optionally include, or may optionally be combined with, a system for efficient free-space finger recognition, the system comprising: a support means for lifting a projection head above a surface; a projection head means affixed to the support means, the projection heads means comprising a depth sensor means for measuring the distance of a target from the projection head means towards the surface; and hand discrimination means for: identifying a surface in a depth image captured by the depth sensor, the surface being a base plane in a viewing frustum derived from the depth image; identifying one or more blobs in the depth image, a blob in the one or more blobs comprising a plurality of contiguous pixels in the depth image that are closer to the depth sensor than the surface; and for each blob in the one or more blobs: determining if the blob intersects an edge of the depth image; and classifying the blob as a potential hand if it does intersect with the edge and classify the blob as an object otherwise.

In Example 24, the subject matter of Example 23 may optionally include, wherein identifying the one or more blobs includes: identifying outlying pixels, outlying pixels being pixels in the depth image between the surface and the depth sensor; and determining external contours of the outlying pixels, each contour that is closed corresponding to a blob in the one or more blobs.

In Example 25, the subject matter of Example 24 may optionally include, wherein determining if the blob intersects the edge creating a mask corresponding to the depth image by: adding a predetermined number of pixels from each edge of the depth image to the mask; and adding the pixels of a blob to the mask when a pixel of the contour corresponds to an existing pixel of the mask.

In Example 26, the subject matter of any of Examples 23-25 may optionally include a hand skeleton locator means for determining whether a hand skeleton model can be found for a blob.

In Example 27, the subject matter of Example 26 may optionally include, wherein the hand skeleton locator means is only applied to blobs classified as a potential hand.

In Example 28, the subject matter of any of Examples 23-27 may optionally include, wherein the depth sensor means includes an infrared emitter means for emitting infrared light and an infrared camera means to for capturing the infrared light after reflection from the target, and wherein the support means includes an infrared line emitter means for emitting a plane of infrared light parallel to the surface within view of the infrared camera means.

In Example 29, the subject matter of Example 28 may optionally include a surface touch locator means for: identifying one or more bright spots in an infrared image captured by the infrared camera, the bright spots comprising a plurality of pixels above a threshold; and for each bright spot in the one or more bright spots, classifying the bright spot as either a touch or a no-touch based on the depth image.

In Example 30, the subject matter of any of Examples 28-29 may optionally include, wherein classifying the bright spot as either a touch or a no-touch includes determining whether the bright spot is connected to a hand blob identified from the depth image and classify the bright spot as no-touch if the bright spot is not connected to the hand blob.

In Example 31, the subject matter of any of Examples 28-30 may optionally include, wherein classifying the bright spot as either a touch or a no-touch includes determining whether the bright spot is within a predetermined distance from the surface using the depth image and classify the bright spot as no-touch if the bright spot is not within the predetermined distance.

In Example 32, the subject matter of any of Examples 28-31 may optionally include, wherein classifying the bright spot as either a touch or a no-touch includes: determining whether the size and shape of the bright spot correspond with a model for a fingertip; determining whether the bright spot is connected to a hand blob; determining whether the bright sport is within a predetermined distance from the surface; and if each of the size and shape of the bright spot correspond with a model for the fingertip, the bright spot is connected to the hand blob, and the bright spot is within a predetermined distance from the surface are true, classifying the bright spot as a touch and classify the bright spot as no-touch otherwise.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for efficient free-space finger recognition, the device comprising:
    a base;
    a vertical member, a lower portion of the vertical member affixed to the base;
    a head affixed to an upper portion of the vertical member, the head comprising a depth sensor arranged to have a downward field of view; and
    a hardware circuit implemented hand discriminator to:
    identify a surface in a depth image captured by the depth sensor, the surface being a base plane in a viewing frustum derived from the depth image;
    identify one or more blobs in the depth image, a blob in the one or more blobs comprising a plurality of contiguous pixels in the depth image that are closer to the depth sensor than the surface; and for each blob in the one or more blobs:
        determine if the blob intersects an edge of the depth image including the hand discriminator to create a mask corresponding to the depth image by:
            adding a predetermined number of pixels from each edge of the depth image to the mask; and
            adding the pixels of a blob to the mask when a pixel of a contour of the blob corresponds to an existing pixel of the mask; and
    classify the blob as a potential hand if it does intersect with the edge and classify the blob as an object otherwise, the classification based on whether the blob is within the mask.

2. The device of claim 1, wherein to identify the one or more blobs, the hand discriminator is to:
    identify outlying pixels, outlying pixels being pixels in the depth image between the surface and the depth sensor; and
    determine external contours of the outlying pixels, each external contour that is closed corresponding to the one or more blobs.

3. The device of claim 1, comprising a hand skeleton locator to determine whether a hand skeleton model can be found for a blob.

4. The device of claim 3, wherein the hand skeleton locator is only applied to blobs classified as a potential hand.

5. The device of claim 1, wherein the depth sensor includes an infrared emitter and an infrared camera, and wherein the base includes an infrared line emitter to emit a plane of infrared light parallel to the surface within the field of view.

6. The device of claim 5, comprising a surface touch locator to:
    identify one or more bright spots in an infrared image captured by the infrared camera, the bright spots comprising a plurality of pixels above a threshold; and
    for each bright spot in the one or more bright spots, classify the bright spot as either a touch or a no-touch based on the depth image.

7. The device of claim 5, wherein to classify the bright spot as either a touch or a no-touch includes the surface touch locator to determine whether the bright spot is connected to a hand blob identified from the depth image and classify the bright spot as no-touch if the bright spot is not connected to the hand blob.

8. The device of claim 5, wherein to classify the bright spot as either a touch or a no-touch includes the surface touch locator to determine whether the bright spot is within a predetermined distance from the surface using the depth image and classify the bright spot as no-touch if the bright spot is not within the predetermined distance.

9. The device of claim 5, wherein to classify the bright spot as either a touch or a no-touch includes the surface touch locator to:
    determine whether the size and shape of the bright spot correspond with a model for a fingertip;
    determine whether the bright spot is connected to a hand blob;
    determine whether the bright sport is within a predetermined distance from the surface; and
    if each of the size and shape of the bright spot correspond with a model for the fingertip, the bright spot is connected to the hand blob, and the bright spot is within a predetermined distance from the surface are true, classify the bright spot as a touch and classify the bright spot as no-touch otherwise.

10. A method for efficient free-space finger recognition, the method performed by a circuit implemented device including a depth sensor arranged to have a downward field of view, the method comprising:
identifying a surface in a depth image captured by the depth sensor, the surface being a base plane in a viewing frustum derived from the depth image;
identifying one or more blobs in the depth image, a blob in the one or more blobs comprising a plurality of contiguous pixels in the depth image that are closer to the depth sensor than the surface; and for each blob in the one or more blobs:
determining if the blob intersects an edge of the depth image including creating a mask corresponding to the depth image by:
adding a predetermined number of pixels from each edge of the depth image to the mask; and
adding the pixels of a blob to the mask when a pixel of a contour of the blob corresponds to an existing pixel of the mask; and
classifying the blob as a potential hand if it does intersect with the edge and classify the blob as an object otherwise, the classification based on whether the blob is within the mask.

11. The method of claim 10, wherein identifying the one or more blobs includes:
identifying outlying pixels, outlying pixels being pixels in the depth image between the surface and the depth sensor; and
determining external contours of the outlying pixels, each external contour that is closed corresponding to the one or more blobs.

12. The method of claim 10, comprising determining whether a hand skeleton model can be found for a blob.

13. The method of claim 12, wherein determining whether a hand skeleton model can be found for the blob is limited to blobs classified as a potential hand.

14. A machine readable medium that is not a transitory propagating signal, the machine readable medium including instructions that, when executed by a machine, cause the machine to perform operations comprising:
identifying a surface in a depth image captured by the depth sensor, the surface being a base plane in a viewing frustum derived from the depth image;
identifying one or more blobs in the depth image, a blob in the one or more blobs comprising a plurality of contiguous pixels in the depth image that are closer to the depth sensor than the surface; and for each blob in the one or more blobs:
determining if the blob intersects an edge of the depth image including creating a mask corresponding to the depth image by:
adding a predetermined number of pixels from each edge of the depth image to the mask; and
adding the pixels of a blob to the mask when a pixel of a contour of the blob corresponds to an existing pixel of the mask; and
classifying the blob as a potential hand if it does intersect with the edge and classify the blob as an object otherwise, the classification based on whether the blob is within the mask.

15. The machine readable medium of claim 14, wherein identifying the one or more blobs includes:
identifying outlying pixels, outlying pixels being pixels in the depth image between the surface and the depth sensor; and
determining external contours of the outlying pixels, each external contour that is closed corresponding to the one or more blobs.

16. The machine readable medium of claim 14, comprising determining whether a hand skeleton model can be found for a blob.

17. The machine readable medium of claim 16, wherein determining whether a hand skeleton model can be found for the blob is limited to blobs classified as a potential hand.

18. The machine readable medium of claim 14, wherein the depth sensor includes an infrared emitter and an infrared camera, and wherein a base for the device includes an infrared line emitter to emit a plane of infrared light parallel to the surface.

19. The machine readable medium of claim 18, comprising:
identifying one or more bright spots in an infrared image captured by the infrared camera, the bright spots comprising a plurality of pixels above a threshold; and
for each bright spot in the one or more bright spots, classifying the bright spot as either a touch or a no-touch based on the depth image.

20. The machine readable medium of claim 18, wherein classifying the bright spot as either a touch or a no-touch includes determining whether the bright spot is connected to a hand blob identified from the depth image and classifying the bright spot as no-touch if the bright spot is not connected to the hand blob.

21. The machine readable medium of claim 18, wherein classifying the bright spot as either a touch or a no-touch includes determining whether the bright spot is within a predetermined distance from the surface using the depth image and classifying the bright spot as no-touch if the bright spot is not within the predetermined distance.

22. The machine readable medium of claim 18, wherein classifying the bright spot as either a touch or a no-touch includes:
determining whether the size and shape of the bright spot correspond with a model for a fingertip;
determining whether the bright spot is connected to a hand blob;
determining whether the bright sport is within a predetermined distance from the surface; and
if each of the size and shape of the bright spot correspond with a model for the fingertip, the bright spot is connected to the hand blob, and the bright spot is within a predetermined distance from the surface are true, classifying the bright spot as a touch and classify the bright spot as no-touch otherwise.

* * * * *